(12) United States Patent
Wu et al.

(10) Patent No.: US 12,744,416 B2
(45) Date of Patent: Sep. 22, 2026

(54) STATOR LAMINATION, STATOR STRUCTURE, MOTOR STRUCTURE, AND LAUNDRY TREATMENT APPARATUS

(71) Applicants: FOSHAN WELLING WASHER MOTOR MANUFACTURING CO., LTD., Foshan (CN); MIDEA WELLING MOTOR TECHNOLOGY (SHANGHAI) CO., LTD., Shanghai (CN)

(72) Inventors: Yuehong Wu, Foshan (CN); Wenrui Li, Foshan (CN); Yunfeng Cheng, Foshan (CN)

(73) Assignees: FOSHAN WELLING WASHER MOTOR MANUFACTURING CO., LTD., Foshan (CN); MIDEA WELLING MOTOR TECHNOLOGY (SHANGHAI) CO., LTD., Shanghai (CN)

( * ) Notice: Subject to any disclaimer, the term of this patent is extended or adjusted under 35 U.S.C. 154(b) by 222 days.

(21) Appl. No.: 18/601,262

(22) Filed: Mar. 11, 2024

(65) Prior Publication Data

US 2024/0213829 A1 Jun. 27, 2024

Related U.S. Application Data

(63) Continuation of application No. PCT/CN2022/078884, filed on Mar. 2, 2022.

(30) Foreign Application Priority Data

Sep. 17, 2021 (CN) ........................ 202111094105.4
Sep. 17, 2021 (CN) ........................ 202122262610.7

(51) Int. Cl.
*H02K 1/16* (2006.01)
*H02K 1/276* (2022.01)
*H02K 21/14* (2006.01)

(52) U.S. Cl.
CPC ........... *H02K 1/165* (2013.01); *H02K 1/2773* (2013.01); *H02K 21/14* (2013.01)

(58) Field of Classification Search
CPC ...... H02K 1/165; H02K 1/2773; H02K 21/14; H02K 21/16; H02K 2201/03; H02K 2213/03; H02K 29/03; H02K 1/146
See application file for complete search history.

(56) References Cited

U.S. PATENT DOCUMENTS 5,670,836 A * 9/1997 Horst .................... H02K 21/16 310/168
5,773,908 A * 6/1998 Stephens .................. H02P 6/26 310/216.096

(Continued)

FOREIGN PATENT DOCUMENTS

CN 1269919 A 10/2000
CN 103427509 A 12/2013

(Continued)

OTHER PUBLICATIONS

Second Office Action dated Apr. 30, 2025 received in Chinese Patent Application No. 202111094105.4.

(Continued)

*Primary Examiner* — Thomas Truong
(74) *Attorney, Agent, or Firm* — K&L Gates LLP

(57) ABSTRACT

A stator lamination, a stator structure, a motor structure, and a laundry treatment apparatus are provided. The stator lamination includes a stator yoke and multiple stator teeth arranged on the stator yoke, and tooth shoes arranged on the ends of the stator teeth distant from the stator yoke. The stator teeth are circumferentially distributed around the axis (Continued)

of the stator lamination. A winding groove is formed between two adjacent stator teeth. A first notch and a second notch, arranged in the radial direction of the stator teeth, are formed between two adjacent tooth shoes. The notch width of the first notch is different from that of the second notch.

5 Claims, 5 Drawing Sheets

(56) References Cited

U.S. PATENT DOCUMENTS

| | | | | |
|---|---|---|---|---|
| 2003/0107290 | A1 * | 6/2003 | De Filippis | H02K 29/03 310/156.56 |
| 2004/0130236 | A1 * | 7/2004 | Yonekura | H02K 29/03 310/216.011 |
| 2017/0018980 | A1 * | 1/2017 | Yang | H02K 29/03 |
| 2017/0104399 | A1 | 4/2017 | Yoon et al. | |
| 2019/0157946 | A1 * | 5/2019 | Andersson | H02K 1/12 |
| 2021/0175785 | A1 * | 6/2021 | Deng | H02K 1/2791 |

FOREIGN PATENT DOCUMENTS

| | | | |
|---|---|---|---|
| CN | 108512320 | A | 9/2018 |
| CN | 108683276 | A | 10/2018 |
| CN | 211405625 | U | 9/2020 |
| CN | 112491168 | A | 3/2021 |
| CN | 112671120 | A | 4/2021 |
| CN | 112865465 | A | 5/2021 |
| CN | 113300501 | A | 8/2021 |
| CN | 113890217 | A | 1/2022 |
| CN | 216056507 | U | 3/2022 |
| JP | S57180339 | A | 11/1982 |
| JP | H0629353 | U | 4/1994 |
| JP | 2002136003 | A | 5/2002 |
| JP | 2010263786 | A | 11/2010 |

OTHER PUBLICATIONS

Third Office Action dated Oct. 28, 2025 received in Chinese Patent Application No. 202111094105.4.

Fourth Office Action dated Nov. 3, 2025 received in Chinese Patent Application No. 202111094105.4.

Extended European search report dated Oct. 29, 2024 received in European Patent Application No. 22868588.9.

First Office Action dated Dec. 29, 2024 received in Chinese Patent Application No. 202111094105.4.

International Search Report dated Jun. 2, 2022 issued in PCT /CN2022/078884.

Chinese Decision of Rejection dated Dec. 16, 2025 received in Chinese Patent Application No. 202111094105.4.

* cited by examiner 100
102
104
1022
b0
110
h1
h0
b1
108
106

STATOR LAMINATION, STATOR STRUCTURE, MOTOR STRUCTURE, AND LAUNDRY TREATMENT APPARATUS

CROSS-REFERENCE TO RELATED APPLICATIONS

The present application is a continuation application of PCT International Application No. PCT/CN2022/078884 filed on Mar. 2, 2022, which claims priority to and benefits of Chinese Patent Application No. 202111094105.4 filed on Sep. 17, 2021 and Chinese Patent Application No. 202122262610.7 filed on Sep. 17, 2021, the entire contents of each of which are incorporated herein by reference for all purposes. No new matter has been introduced.

FIELD

The present disclosure relates to the field of laundry treatment apparatuses, and particularly relates to a stator lamination, a stator structure, a motor structure, and a laundry treatment apparatus.

BACKGROUND

For a laundry treatment apparatus, the performance of a motor disposed therein is an important factor for determining the advantages and disadvantages of the use of the laundry treatment apparatus. Currently, the requirements for the performance and the cost performance of the motor have gradually become higher, and for the motor, noise is usually generated due to the interaction between a stator and a rotor.

SUMMARY

The present disclosure aims to solve at least one of the problems in the prior art or the related art.

In view of this, the embodiment of the first aspect of the present disclosure provides a stator lamination.

The embodiment of the second aspect of the present disclosure provides a stator structure.

The embodiment of the third aspect of the present disclosure provides a motor structure.

The embodiment of the fourth aspect of the present disclosure provides a laundry treatment apparatus.

In order to achieve the above purpose, the embodiment of the first aspect of the present disclosure provides a stator lamination, comprising: a stator yoke and a plurality of stator teeth arranged on the stator yoke, wherein the plurality of stator teeth are circumferentially distributed around an axis of the stator lamination, and a winding groove is formed between two adjacent stator teeth; and tooth shoes arranged on the ends of the stator teeth distant from the stator yoke, wherein a first notch and a second notch arranged in a radial direction of the stator teeth are formed between two adjacent tooth shoes, and the notch width of the first notch is different from that of the second notch.

The stator lamination provided by the embodiment according to the first aspect of the present disclosure mainly comprises the stator yoke, the stator teeth and the tooth shoes. Each stator lamination can be provided with the stator yoke, the stator teeth and the winding groove, the stator teeth are provided on the stator yoke, the winding groove is formed between two adjacent stator teeth, to facilitate to wind a stator winding on the winding groove, which can produce a magnetic field for a rotor to achieve the function of a stator.

according to an embodiment, the notch of the winding groove opened in the stator lamination has a certain hierarchy. The first notch and the second notch are formed between two adjacent tooth shoes, the two notches are arranged in the radial direction of the stator teeth, and the notch widths of the two notches are different from each other. The notch width can be defined as the circumferential width between the tooth shoes of two adjacent stator teeth. When the notch width is relatively large, air gap magnetic conductivity will be optimized, an electromagnetic radial force can be significantly reduced, and thus noise is reduced; however, the slot fullness rate of the stator winding in the entire winding groove will be affected to a certain extent. According to the present solution, directly opening a plurality of notches with different widths in one stator lamination can take into consideration both aspects of noise and slot fullness rate and improve the product competitiveness of the motor.

Furthermore, the types of the motor, to which a stator iron core composed by the stator lamination is applied, may be different; for example, it can be a bidirectional motor, or a unidirectional motor rotating in a specified direction, and thus, for different types of motors, the shapes of the notch are further different.

In addition, the stator lamination in the above embodiment provided by the present disclosure can further have the following additional features:

in the above embodiment, the first notch is provided at the radial inner side of the second notch, and the notch width of the first notch is greater than that of the second notch.

In the embodiment, by limiting that the position of the first notch is oriented inward and the notch width of the first notch is relatively large, the air gap magnetic conductivity can be optimized under the action of the first notch, and then the electromagnetic radial force is reduced.

It needs to be explained that the electromagnetic radial force is a force wave that flows from the rotor structure through the air gap to the stator structure.

In the above embodiment, the first notch is symmetrical relative to the axis of symmetry of two adjacent stator teeth.

In the embodiment, by limiting that the first notch is in a symmetric shape and its axis of symmetry coincides with the axis of symmetry of two adjacent stator teeth, the shape of the entire first notch is relatively regular; for the notch of each winding groove, the tooth shoes at the two ends have the same structure, which facilitates the processing. Meanwhile, on the basis of the symmetrically arranged first notch, the electromagnetic radial force generated by the rotor structure on the stator structure can be reduced.

In the above embodiment, the first notch is asymmetric relative to the axis of symmetry of the two adjacent stator teeth.

In the embodiment, by limiting that the first notch is in an asymmetric shape, a relatively good noise reduction effect can be achieved when the stator lamination is applied to a unidirectional rotating motor structure. The eccentric arrangement of the first notch can simplify the processing, that is, only one side of the tooth shoes needs to be processed.

Furthermore, for different application scenes, the portion of the front pole shoe of the tooth shoes can be separately cut, or the portion of the rear pole shoe of the tooth shoes can be separately cut.

The portion of the front pole shoe and the portion of the rear pole shoe of the tooth shoes can be cut at the same time, but the cutting degrees are different.

In the above embodiment, on the tooth shoes at the side of the winding groove, the first notch and the second notch are flush with each other.

In the embodiment, on the basis that the first notch is asymmetrically arranged, it is defined that the first notch and the second notch are flush with each other in one tooth shoe; it is understandable that the portion of tooth shoes need not to be processed at this moment, and only the tooth shoes at the other side of the winding groove need to be processed.

In the above embodiment, on the tooth shoes at the two sides of the winding groove, a first tooth shoe length corresponding to the first notch and a second tooth shoe length corresponding to the second notch have different ratios.

In the embodiment, by limiting that the ratios of the first tooth shoe length to the second tooth shoe length are different on the tooth shoes at the two sides, it is understandable that on a single tooth shoe, the above ratio relation can correspond to a specific structure; by limiting that the above ratios of the tooth shoes at the two sides are different, it means that the tooth shoe structures at the two sides are different, and do not present a symmetrical shape, and thus can be flexibly arranged according to different use requirements.

The specific ratio arrangement can be determined according to actual designing requirements.

In the above embodiment, the notch height corresponding to the second notch is larger than the thickness of the stator lamination.

In the embodiment, by limiting that the notch height of the second notch needs to be larger than the thickness of the stator lamination, the most basic structural strength requirement is met; if the notch height is overly small, it is easy to deform, which affects electromagnetic performance.

The first notch is formed by cutting on the second notch; after the completing of the cutting, it can be further defined that the notch height of the first notch needs to be larger than that of the second notch, and the two aspects of noise and slot fullness rate can be both taken into consideration during use, and thus the product competitiveness of the motor which adopts the stator lamination can be effectively improved.

Generally, the thickness of the stator lamination is in a range of 0.4 mm~0.8 mm; apparently, the thickness is not limited to the above values, as long as the notch height of the second notch is defined to be larger than the thickness during design.

It is understandable that the notch height is a size of the second notch extending along a radial direction.

In the above embodiment, the range of the ratio of the notch width of the first notch to the notch width of the second notch is 1~4.

In the embodiment, by limiting that the range of the ratio of the notch width of the first notch to the notch width of the second notch is 1~4, it can be limited that the notch width of the first notch will not be overly large and will not be overly small; if the notch width is overly large, the strength of the tooth shoes will be affected; if the notch width is overly small, a radial force wave cannot be lowered and the noise reduction effect will not be achieved.

An embodiment according to the second aspect of the present disclosure provides a stator structure, comprising: a plurality of stator laminations in the embodiments in the above first aspect, wherein the plurality of stator laminations are stacked.

The stator structure provided by the embodiment according to the second aspect of the present disclosure comprises a plurality of stacked stator laminations, wherein, the stator structure is provided with the stator laminations in the embodiments of the first aspect, and thus has the beneficial effect of any of the above stator laminations, which are not repeated herein.

In the above embodiment, the stator structure further comprises: a plurality of first standard laminations, wherein the first standard laminations and the stator laminations are stacked along an axial direction of the stator structure; wherein, the notch width of the first standard lamination is smaller than the notch width of the stator lamination.

In the embodiment, the stator structure comprises the first standard laminations and the stator laminations, by mixing and stacking two types of laminations, existing standard laminations can be effectively utilized and mixed with the stator laminations provided in the present disclosure to form a stator structure.

In the present solution, the notch width of the first standard lamination is smaller than the notch width of the stator lamination, to satisfy the combined use of a small notch lamination and the stator lamination.

In the above embodiment, the stator structure further comprises: a plurality of second standard laminations, wherein the second standard laminations and the stator laminations are stacked along the axial direction of the stator structure; wherein, the notch width of the second standard lamination is larger than the notch width of the stator lamination.

In the embodiment, the stator structure comprises the second standard laminations and the stator laminations, by mixing and stacking two types of laminations, existing standard laminations can be effectively utilized and mixed with the stator laminations provided in the present disclosure to form a stator structure.

In the present solution, the notch width of the second standard lamination is larger than the notch width of the stator lamination, to satisfy the combined use of a large notch lamination and the stator lamination.

An embodiment of the third aspect of the present disclosure provides a motor structure, comprising: a rotor structure; and the stator structure in the embodiments of the above first aspect, arranged coaxially with the rotor structure, wherein the rotor structure can rotate relative to the stator structure.

The motor structure provided by the embodiment according to the third aspect of the present disclosure comprises the rotor structure and the stator structure, and the rotor structure can rotate relative to the stator structure, thereby achieving the normal function of a motor. The motor structure is provided with the stator structure in the embodiments of the second aspect and thus has the beneficial effect of any of the above stator structure, which is not repeated herein.

In the above embodiment, the rotor structure is provided with a plurality of permanent magnet slots, and the plurality of permanent magnet slots are arranged in a circle along the circumference of the rotor structure.

In the embodiment, through arranging a plurality of permanent magnet slots in the rotor structure, they can be used for placing permanent magnets; since the plurality of permanent magnet slots are arranged in a circle along the circumferential direction, under the effect of the stator structure, they can bring the rotor structure to rotate integrally by the force of a magnetic field.

An embodiment of the fourth aspect of the present disclosure provides a laundry treatment apparatus, comprising: a housing; and the motor structure in the embodiment of the above third aspect, provided in the housing.

The laundry treatment apparatus provided by the embodiment of the fourth aspect of the present disclosure comprises the housing and the motor structure provided in the housing; the laundry treatment apparatus is provided with the motor structure in the embodiment of the above third aspect, and thus has the beneficial effect of the above motor structure, which are not repeated herein.

The additional aspects and advantages of the present disclosure will be obvious in the following description, or can be understood through the implementation of the present disclosure.

The corresponding relationships between the reference signs and the component names in FIG. 1 to FIG. 10 are as follows:

100: stator lamination, 102: stator yoke, 1022: stator tooth, 104: winding groove, 106: tooth shoe, 108: first notch, 110: second notch, 202: first standard lamination, 204: second standard lamination, 300: motor structure, 302: rotor structure, 304: permanent magnet slot, 400: laundry treatment apparatus, and 402: housing.

DETAILED DESCRIPTION OF THE DISCLOSURE

To more clearly understand the above purposes, features and advantages of the present disclosure, the present disclosure will be further detailed hereinafter in combination with the accompanying drawings and embodiments. It should be indicated that in the case of no conflict, the embodiments and the features in the embodiments of the present disclosure can be combined with each other.

Many details are illustrated in the following description for the convenience of a thorough understanding to the present disclosure, but the present disclosure can further be implemented using other embodiments other than these described herein. Therefore, the protection scope of the present disclosure is not limited to the specific embodiments disclosed in the following text.

Some embodiments of the present disclosure are described in the following by referring to FIG. 1 to FIG. 10.

Figures 1, 2:
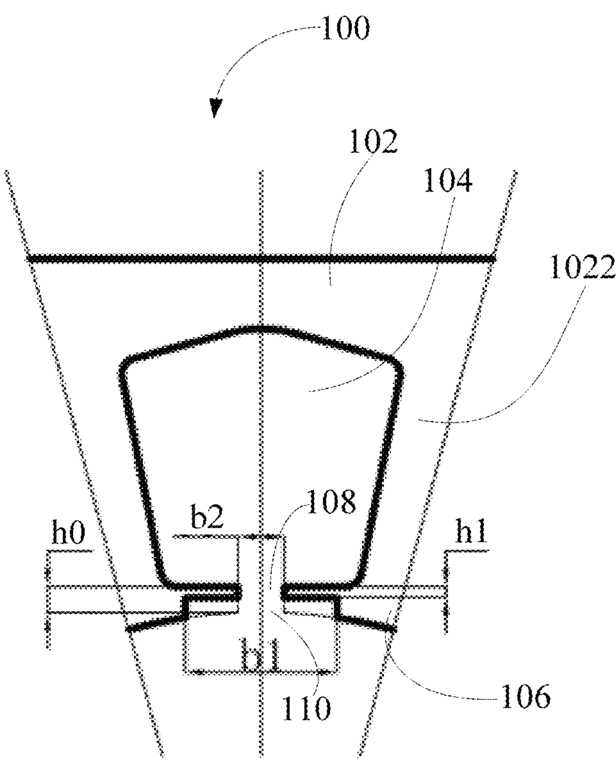
FIG. 1 is a schematic view of the structure of a stator lamination according to an embodiment of the present disclosure.
FIG. 2 is a schematic view of the structure of a stator lamination according to an embodiment of the present disclosure.

As shown in FIG. 1 and FIG. 2, the stator lamination 100 provided by the present embodiment mainly comprises a stator yoke 102, stator teeth 1022 and tooth shoes 106. Each stator lamination 100 can be provided with the stator yoke 102, the stator teeth 1022 and a winding groove 104, the stator teeth 1022 are provided on the stator yoke 102, the winding groove 104 is formed between two adjacent stator teeth 1022, to facilitate to wind a stator winding on the winding groove 104, and this can produce a magnetic field for a rotor to achieve the function of a stator.

The notch of the winding groove 104 opened in the stator lamination 100 has a certain hierarchy, and the first notch 108 and the second notch 110 are formed between two adjacent tooth shoes 106, the two notches are arranged in a radial direction of the stator teeth 1022, and the notch widths of the two notches are different from each other. The notch width can be defined as the circumferential width between the tooth shoes 106 of two adjacent stator teeth 1022; when the notch width is relatively large, air gap magnetic conductivity will be optimized, an electromagnetic radial force can be significantly reduced, and thereby noise is reduced, but the slot fullness rate of the stator winding in the entire winding groove 104 will be affected to a certain extent, and thus, in the present solution, directly opening a plurality of notches with different widths in one stator lamination 100 can take into consideration both aspects of noise and slot fullness rate and improve the product competitiveness of the motor.

Furthermore, the types of the motor, to which a stator iron core composed by the stator lamination is applied, may be different, for example, it can be a bidirectional motor, or a unidirectional motor rotating in a specified direction, and thus, for different types of motors, the shapes of the notch are further different.

The notch height of the second notch 110 needs to be larger than the thickness of the stator lamination 100, to meet the most basic structural strength requirement; if the notch height is overly small, it is easy to deform, which affects electromagnetic performance.

The first notch is formed by cutting on the second notch 110; after the completing of the cutting, it can be further defined that the notch height of the first notch needs to be larger than that of the second notch 110, and the two aspects of noise and slot fullness rate can be both taken into consideration during use, and thus the product competitiveness of the motor which adopts the stator lamination can be effectively improved.

Generally, the thickness of the stator lamination is in a range of 0.4 mm~0.8 mm; apparently, the thickness is not limited to the above values, as long as the notch height of the second notch 110 is defined to be larger than the thickness during design.

Due to the limitation of the cutting process, the first notch 108 is formed by cutting on the second notch 110, and thus the notch height of the first notch 108 cannot exceed the notch height of the second notch 110.

It is understandable that the notch height is a size of the second notch 110 extending along a radial direction.

It needs to be supplemented that the range of the ratio of the notch width of the first notch 108 to the notch width of the second notch 110 is 1~4, it can be limited that the notch width of the first notch 108 will not be overly large and will not be overly small; if the notch width is overly large, the strength of the tooth shoes 106 will be affected; if the notch width is overly small, a radial force wave cannot be lowered and the noise reduction effect will not be achieved.

In an exemplary embodiment, a stator lamination 100 is provided, and the stator lamination 100 comprises a yoke portion (i.e., the stator yoke) and a tooth portion (i.e., the stator tooth). The tooth portion comprises a tooth body and a tooth shoe 106. For the tooth shoe 106, on the basis of the original traditional tooth shoes, it is subjected to bilateral tooth shoes cutting to form a symmetrical or asymmetric stepped notch. The notch height of the original tooth shoe is h0 (i.e., the sum of the notch height of the first notch and the notch height of the second notch), and the notch width is b0. After cutting, the notch height is lowered to h1 (i.e., the notch height of the second notch), and the notch width still is b0; in addition, a big auxiliary notch appears at the outer side of the tooth shoe, and the notch width is b1. The above parameters meet the mathematic relation: $0.5\ \text{mm} < h1 < ho$; and $b0 < b1 < 4b0$.

Figure 5:
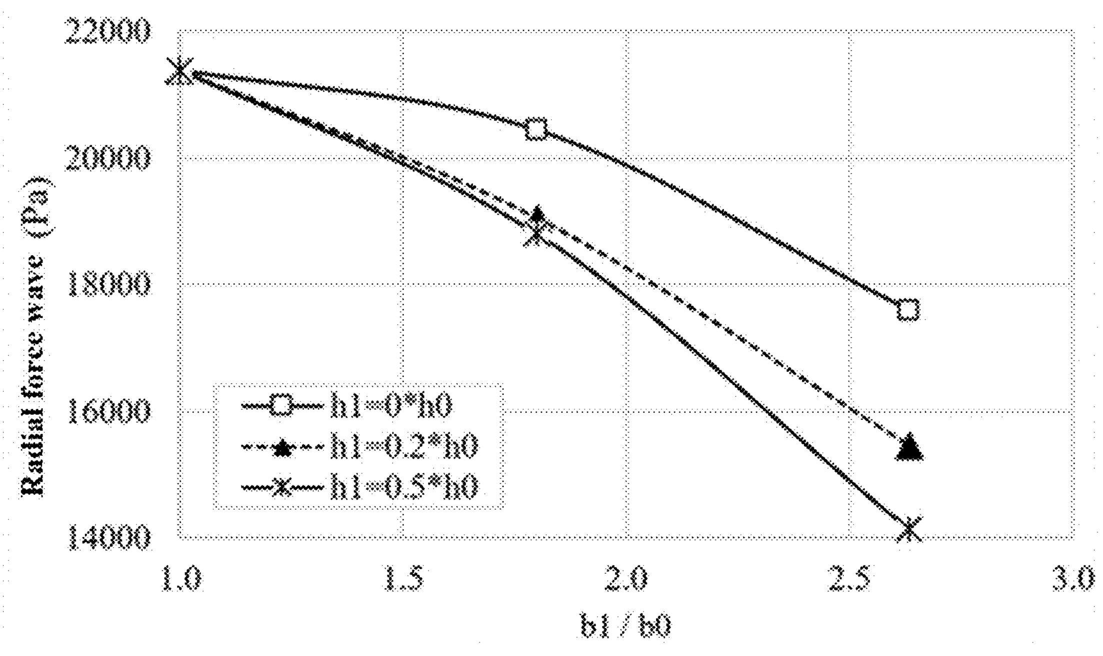
FIG. 5 is a schematic view of a bending line of a radial force wave according to an embodiment of the present disclosure.

As shown in FIG. 5, after using the stator lamination 100 of the present embodiment, the radial force wave is detected. The horizontal coordinate is a ratio of b1 to b0, and with the increasing of the ratio, the generated radial force wave will decrease gradually.

As shown in FIG. 1, the stator lamination 100 provided by the present embodiment mainly comprises a stator yoke 102, stator teeth 1022 and tooth shoes 106. Each stator lamination 100 can be provided with the stator yoke 102, the stator teeth 1022 and a winding groove 104, the stator teeth 1022 are provided on the stator yoke 102, the winding groove 104 is formed between two adjacent stator teeth 1022, to facilitate to wind a stator winding on the winding groove 104, and this can produce a magnetic field for a rotor to achieve the function of a stator.

The notch of the winding groove 104 opened in the stator lamination 100 has a certain hierarchy, and a first notch 108 and a second notch 110 can be formed between two adjacent tooth shoes 106, the two notches are arranged in the radial direction of the stator teeth 1022, and the notch widths of the two notches are different from each other. The notch width can be defined as the circumferential width between the tooth shoes 106 of two adjacent stator teeth 1022; when the notch width is relatively large, when the size is relatively large, air gap magnetic conductivity will be optimized, an electromagnetic radial force can be significantly reduced, and thereby noise is reduced, but the slot fullness rate of the stator winding in the entire winding groove 104 will be affected to a certain extent, and thus, in the present solution, directly opening a plurality of notches with different widths in one stator lamination 100 can take into consideration both aspects of noise and slot fullness rate and improve the product competitiveness of the motor.

Along a radial direction of the stator lamination 100, the position of the first notch 108 is oriented inward, and the notch width is relatively large; the position of the second notch 110 is oriented outward, and the notch width is relatively small, and air gap magnetic conductivity is optimized under the action of the first notch 108, and thus the electromagnetic radial force is lowered.

The electromagnetic radial force can be a force wave that flows from a rotor structure 302 through the air gap to the stator structure.

Figure 4:
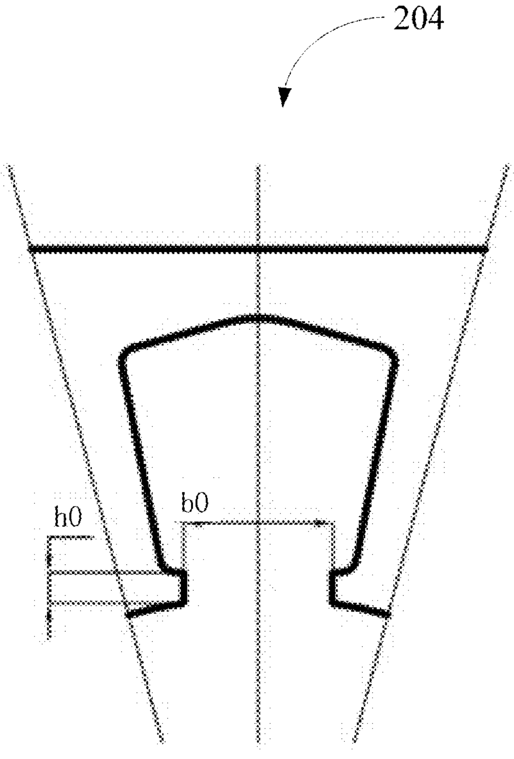
FIG. 4 is a schematic view of the structure of a second standard lamination according to an embodiment of the present disclosure.

As shown in FIG. 4 and FIG. 5, the stator lamination 100 provided by the present embodiment mainly comprises a stator yoke 102, stator teeth 1022 and tooth shoes 106. For example, each stator lamination 100 is provided with the stator yoke 102, the stator teeth 1022 and a winding groove 104, the stator teeth 1022 are provided on the stator yoke 102, the winding groove 104 is formed between two adjacent stator teeth 1022, to facilitate to wind a stator winding on the winding groove 104, and this can produce a magnetic field for a rotor to achieve the function of a stator.

The notch of the winding groove 104 opened in the stator lamination 100 has a certain hierarchy, and for example, a first notch 108 and a second notch 110 are formed between two adjacent tooth shoes 106, the two notches are arranged in the radial direction of the stator teeth 1022, and the notch widths of the two notches are different from each other. The notch width can be defined as the circumferential width between the tooth shoes 106 of two adjacent stator teeth 1022; when the notch width is relatively large, when the size is relatively large, air gap magnetic conductivity will be optimized, an electromagnetic radial force can be significantly reduced, and thereby noise is reduced, but the slot fullness rate of the stator winding in the entire winding groove 104 will be affected to a certain extent, and thus, in the present solution, directly opening a plurality of notches with different widths in one stator lamination 100 can take into consideration both aspects of noise and slot fullness rate and improve the product competitiveness of the motor.

In an exemplary embodiment, as shown in FIG. 1, the first notch 108 presents a symmetric shape and its axis of symmetry coincides with the axis of symmetry of two adjacent stator teeth 1022, the shape of the entire first notch 108 is relatively regular; for the notch of each winding groove 104, the tooth shoes 106 at the two ends have the same structure, and this facilitates the processing. Meanwhile, on the basis of the symmetrically arranged first notch 108, the electromagnetic radial force generated by a rotor structure 302 on the stator structure can be reduced.

In another exemplary embodiment, as shown in FIG. 2, the first notch 108 presents an asymmetric shape, a relatively good noise reduction effect can be achieved when the stator lamination 100 is applied to a unidirectional rotating motor structure 300. The eccentric arrangement of the first notch 108 can simplify the processing procedure during processing, that is, only one side of the tooth shoes 106 needs to be processed.

Furthermore, for different application scenes, the portion of the front pole shoe of the tooth shoes 106 can be separately cut, or the portion of the rear pole shoe of the tooth shoes 106 can be separately cut.

The portion of the front pole shoe and the portion of the rear pole shoe of the tooth shoes 106 can be cut at the same time, but the cutting degrees are different.

On the basis that the first notch 108 is asymmetrically arranged, it is defined that the first notch 108 and the second notch 110 are flush with each other in one tooth shoe 106; it is understandable that the portion of tooth shoes 106 need not to be processed at this moment, and only the tooth shoes 106 at the other side of the winding groove 104 need to be processed.

In addition, the ratios of the length of the first tooth shoe 106 to the length of the second tooth shoe 106 are different on the tooth shoes 106 at the two sides, it is understandable that on a single tooth shoe 106, the above ratio relation can correspond to a specific structure; by limiting that the above ratios of the tooth shoes 106 at the two sides are different, it means that the structures of the tooth shoes 106 at the two sides are different, and do not present a symmetrical shape, and thus can be flexibly arranged according to different use requirements.

The specific ratio arrangement can be determined according to actual designing requirements.

As shown in FIG. 1, the present embodiment provides a stator structure, comprising a plurality of stacked stator laminations 100, and the stator lamination 100 mainly comprises a stator yoke 102, stator teeth 1022 and tooth shoes 106. Each stator lamination 100 can be provided with the stator yoke 102, the stator teeth 1022 and a winding groove 104, the stator teeth 1022 are provided on the stator yoke 102, the winding groove 104 is formed between two adjacent stator teeth 1022, to facilitate to wind a stator winding on the winding groove 104, and this can produce a magnetic field for a rotor to achieve the function of a stator. A first notch 108 and a second notch 110 are formed between two adjacent tooth shoes 106, the two notches are arranged in the radial direction of the stator teeth 1022, and the notch widths of the two notches are different from each other. The notch width can be defined as the circumferential width between the tooth shoes 106 of two adjacent stator teeth 1022; when the notch width is relatively large, when the size is relatively large, air gap magnetic conductivity will be optimized, an electromagnetic radial force can be significantly reduced, and thereby noise is reduced, but the slot fullness rate of the stator winding in the entire winding groove 104 will be affected to a certain extent, and thus, in the present solution, directly opening a plurality of notches with different widths in one stator lamination 100 can take into consideration both aspects of noise and slot fullness rate and improve the product competitiveness of the motor.

Figure 6:
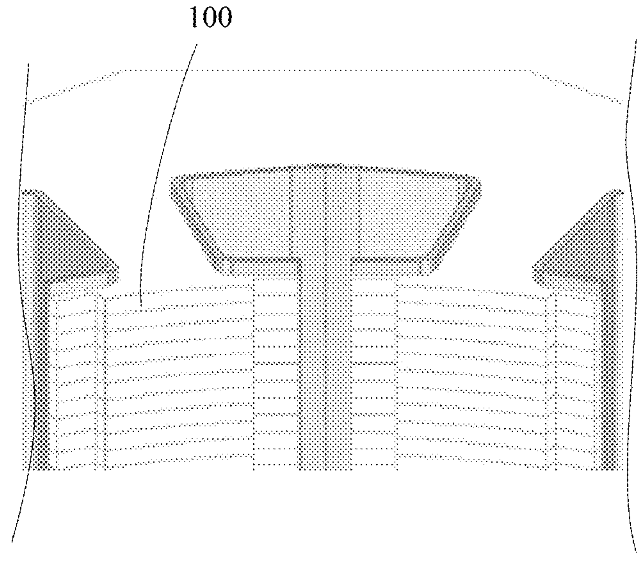
FIG. 6 is a schematic view of a combined structure of stator laminations according to an embodiment of the present disclosure.

In an exemplary embodiment, as shown in FIG. 6, the stator structure is only separately formed by the above stator lamination 100.

Figure 3:
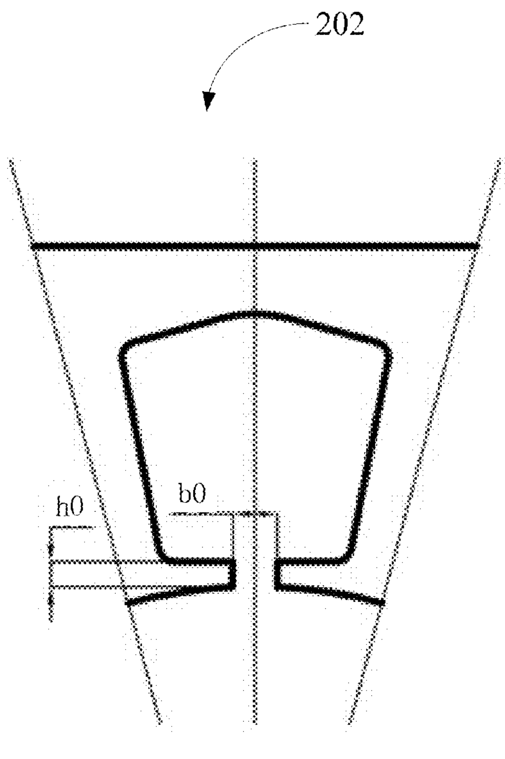
FIG. 3 is a schematic view of the structure of a first standard lamination according to an embodiment of the present disclosure.
Figure 8:
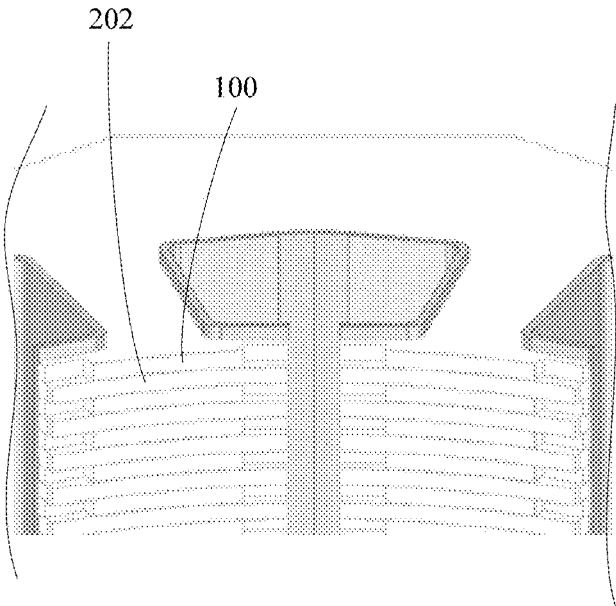
FIG. 8 is a schematic view of a combined structure of a stator lamination and a first standard lamination according to an embodiment of the present disclosure.

In another exemplary embodiment, as shown in FIG. 3 and FIG. 8, the stator structure comprises a first standard lamination 202 and the stator lamination 100, by mixing and stacking two types of laminations, existing standard laminations can be effectively utilized and mixed with the stator laminations 100 provided in the present disclosure to form a stator structure.

In the present solution, the notch width of the first standard lamination 202 is smaller than the notch width of the stator lamination 100, to satisfy the combined use of a small notch lamination and the stator lamination 100.

Figure 7:
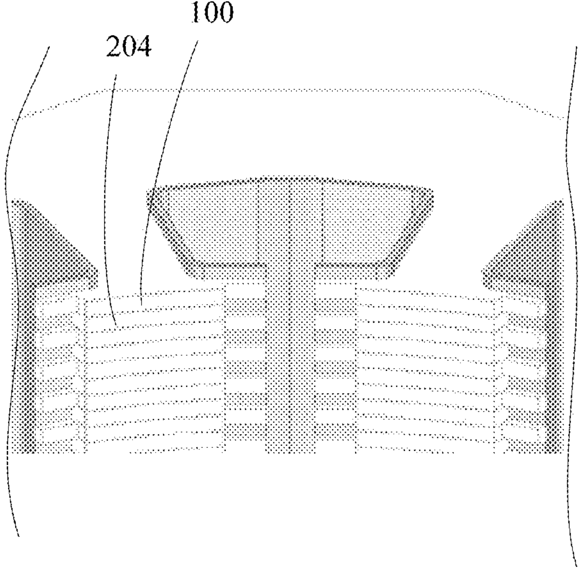
FIG. 7 is a schematic view of a combined structure of a stator lamination and a second standard lamination according to an embodiment of the present disclosure.

In another exemplary embodiment, as shown in FIG. 4 and FIG. 7, the stator structure comprises second standard laminations 204 and the stator laminations 100, by mixing and stacking two types of laminations, existing standard laminations can be effectively utilized and mixed with the stator laminations 100 provided in the present disclosure to form a stator structure.

In the present solution, the notch width of the second standard lamination 204 is larger than the notch width of the stator lamination 100, to satisfy the combined use of a large notch lamination and the stator lamination 100.

Figure 9:
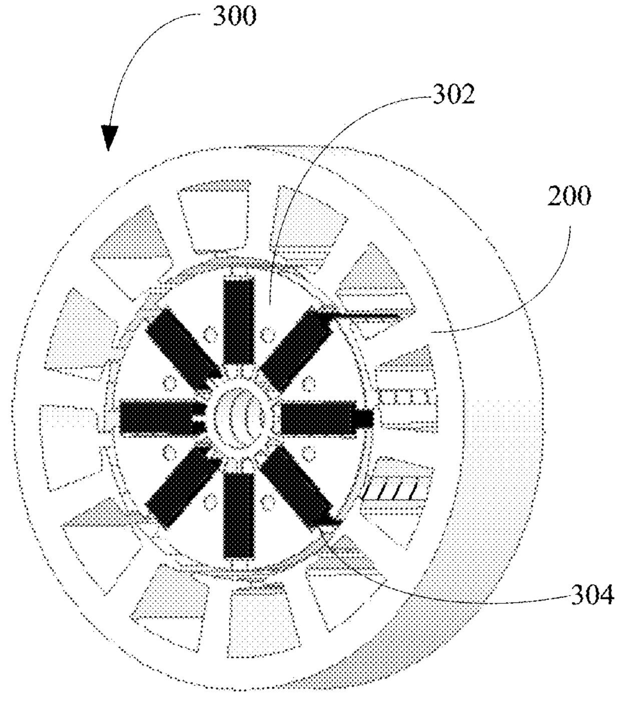
FIG. 9 is a schematic view of the structure of a motor structure according to an embodiment of the present disclosure.

As shown in FIG. 9, the present embodiment provides a motor structure 300, comprising a rotor structure 302 and a stator structure, which are arranged coaxially. The rotor structure 302 can rotate relative to the stator structure. The motor structure 300 is provided with the stator structure in the above embodiments and thus has the beneficial effect of the above embodiments, which are not repeated herein.

Through arranging a plurality of permanent magnet slots 304 in the rotor structure, they can be used for placing permanent magnets; since the plurality of permanent magnet slots 304 are arranged in a circle along the circumferential direction, under the effect of the stator structure, they can bring the rotor structure to rotate integrally by the force of a magnetic field.

Figure 10:
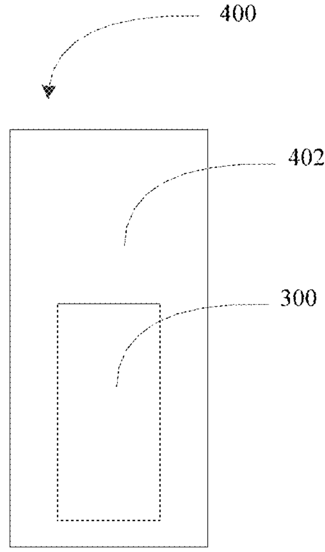
FIG. 10 is a schematic view of the structure of a laundry treatment apparatus according to an embodiment of the present disclosure.

As shown in FIG. 10, a laundry treatment apparatus 400 provided by the present embodiment comprises a housing 402 and a motor structure 300 provided in the housing 402; the housing 402 is provided with the motor structure 300 in the above Embodiment 5, and thus has the beneficial effect of the above motor structure 300, which are not repeated herein.

According to the stator lamination, the motor structure and the laundry treatment apparatus provided by the present disclosure, different notches with a plurality of notch widths are opened in one stator lamination, and thus the two aspects of noise and slot fullness rate can be both taken into consideration, and the product competitiveness of the motor can be effectively improved.

In the present disclosure, the terms of “first”, “second” and “third” are used only for the purpose of description and shall not be understood to indicate or imply any relative importance; the phrase of “a plurality of” indicates two or more, unless otherwise explicitly specified or defined. The terms of “mounting”, “connected to”, “connection”, “fixing” and the like should be understood in a broad sense, unless otherwise clearly defined, for example, “connection” may be a fixed connection, and may further be a removable connection, or an integral connection; and “connected to” may be a mechanical connection, or an electrical connection; they may be a direct connection and may further be an indirect connection through an intermediate medium, and may be an internal communication between two elements. A person of ordinary skills in the art could understand the specific meanings of the terms in the present disclosure according to specific situations.

In the specification of the present disclosure, it is understandable that the orientation or position relations indicated by the terms of “upper”, “lower”, “left”, “right”, “front”, “rear” and the like are based on the orientation or position relations shown in the accompanying drawings, and they are just intended to conveniently describe the present application and simplify the description, and are not intended to indicate or imply that the devices or units as indicated should have specific orientations or should be configured or operated in specific orientations, and then should not be construed as limitations to the present application.

In the description of the present specification, the descriptions of the phrases “one embodiment”, “some embodiments” and “specific embodiments” and the like mean that the specific features, structures, materials or characteristics described in combination with the embodiment(s) or example(s) are included in at least one embodiment or example of the present disclosure. In the specification, the schematic representation of the above phrases does not necessarily refer to the same embodiment or example. Moreover, the particular features, structures, materials or characteristics described may be combined in a suitable manner in any one or more of the embodiments or examples.

The descriptions above are only some embodiments of the present disclosure, and are not used to limit the present disclosure. For a person skilled in the art, the present disclosure may have various changes and variations. Any modifications, equivalent substitutions, improvements, etc. made within the spirit and principle of the present disclosure shall all be included in the protection scope of the present disclosure.

What is claimed is:

1. A stator structure comprising:

a plurality of stator laminations stacked, and a plurality of first standard laminations;

wherein the plurality of first standard laminations and the plurality of stator laminations are stacked along an axial direction of the stator structure, and a notch width of each of the plurality of first standard laminations is smaller than a notch width of each of the plurality of stator laminations;

wherein each of the plurality of stator lamination comprises:

a stator yoke and a plurality of stator teeth arranged on the stator yoke, wherein the plurality of stator teeth are circumferentially distributed around an axis of the stator lamination, and a winding groove is formed between two adjacent stator teeth; and tooth shoes, arranged on ends of the plurality of stator teeth distant from the stator yoke, wherein:

a first notch and a second notch arranged in a radial direction of the stator teeth are formed between two adjacent tooth shoes;

the first notch is provided at a radial inner side of the second notch;

a notch width of the first notch is greater than that of the second notch;

the first notch is asymmetric relative to the axis of symmetry of the two adjacent stator teeth; and one side of the first notch and the second notch relative to the two adjacent stator teeth are flush with each other.

2. The stator structure according to claim 1, further comprising:

a plurality of second standard laminations, wherein the plurality of second standard laminations and the plurality of stator laminations are stacked along an axial direction of the stator structure, wherein a notch width of each of the plurality of second standard laminations is larger than a notch width of each of the plurality of stator laminations.

3. A motor structure comprising:

a rotor structure; and a stator structure according to claim 1, arranged coaxially with the rotor structure, wherein the rotor structure is rotatable unidirectionally or bidirectionally relative to the stator structure.

4. The motor structure according to claim 3, wherein the rotor structure is provided with a plurality of permanent magnet slots, and the plurality of permanent magnet slots are arranged in a circle along a circumference of the rotor structure.

5. A laundry treatment apparatus comprising:

a housing; and the motor structure according to claim 3, wherein the motor structure is provided in the housing.

* * * * *